United States Patent Office 2,824,822
Patented Feb. 25, 1958

2,824,822
INSECT REPELLENT METHOD AND COMPOSITION

Lyle D. Goodhue, Bartlesville, and Kenneth E. Cantrel, Dewey, Okla., assignors to Phillips Petroleum Company, a corporation of Delaware No Drawing. Application June 21, 1955
Serial No. 517,054
20 Claims. (Cl. 167—22)

This invention relates to repelling of insects and to compositions for repelling insects. In one aspect the invention relates to an improved insect repellent composition comprising a ternary mixture comprising first, at least one di-n-alkyl ester of a dicarboxylic acid of pyridine wherein the alkyl groups contain from 2 to 4 carbon atoms; second, at least one 1-acetoxy-3-phenyl-2-alkene wherein the alkene is a normal alkene having from 3 to 4 carbon atoms; at least one N-alkyl imide of bicyclo[2.2.1]-5-heptene-2,3-dicarboxylic acid wherein the alkyl radical contains not more than 12 carbon atoms. In another aspect the invention relates to a method of repelling insects, for example, stable flies, by applying a composition, as set forth herein, at a locus from which the insect is to be repelled.

It is an object of the invention to provide an improved insect repellent composition. It is another object of the invention to provide an improved method of repelling insects. A particular advantage of our repellent composition of three components is that the said composition exhibits longer effective repellent life than any combination of two of the three components, or than any one of the three materials. This increase in the effective life of the repellent composition is sometimes referred to as synergism in this application.

Other objects, as well as aspects and advantages of the invention are apparent from this disclosure and the appended claims.

The diethyl, di-n-propyl and di-n-butyl esters of a dicarboxylic acid of pyridine are known to be effective as agents for repelling houseflies, stable flies, and other insects from surfaces frequented by the insects when the compounds are applied to such surfaces, as set forth and claimed in application Serial No. 240,602, of N. J. Leonard, filed August 6, 1951, now Patent No. 2,757,120. The fly repelling activity of these esters is known to be synergized by the incorporation of N-alkyl imides of bicylo[2.2.1]-5-heptene-2,3-dicarboxylic acid, as disclosed and claimed in application Serial No. 453,122, of Goodhue et al., filed August 30, 1954.

An improved insect repellent composition containing at least one of diethyl, di-n-propyl and di-n-butyl esters of pyridine dicarboxylic acid and at least one of 1-acetoxy-3-phenyl-2-butene and 1-acetoxy-3-phenyl-2-propene is disclosed and claimed in application Serial No. 515,237 of Lyle D. Goodhue, filed June 13, 1955, a continuation-in-part of Serial No. 419,110, filed March 26, 1954, now abandoned.

Serial No. 640,337, filed February 15, 1957, a continuation-in-part of Serial No. 436,706, now abandoned, filed June 14, 1954, discloses and claims, among other things, an insect repellent composition comprising 1-acetoxy-3-phenyl-2-butene in an adjuvant and a method for repelling an insect comprising applying at the place from which the insect is to be repelled, a repellent quantity of 1-acetoxy-3-phenyl-2-butene.

We have now found that a mixture comprising the three components set forth hereinbefore as the essential active repellent composition has a longer effective life thany any one of the components alone or in any mixture of only two of such components. Thus, according to our invention, we have provided a ternary stable fly repellent composition comprising:

(1) At least one di-n-alkyl ester of a carboxylic acid of pyridine wherein the alkyl groups contain from 2 to 4 carbon atoms, (2) At least one 1-acetoxy-3-phenyl-2-alkene wherein the alkene is an alkene having from 3 to 4 carbon atoms, and (3) At least one N-alkyl imide of bicyclo[2.2.1]-5-heptene-2,3-dicarboxylic acid wherein the alkyl radical contains not more than 12 carbon atoms, as the essential active repellent.

The proportion in which these compounds are present in the composition can vary. It is now preferred that the alkyl imide of bicyclo[2.2.1]-5-heptene-2,3-dicarboxylic acid is present in the amount in the range from 25 to 75 weight percent of the ternary mixture, on an undiluted basis and that the other two components be present in the ternary composition in a ratio in the range from 4:1 to 1:4 of the pyridine dicarboxylate to the 1-acetoxy-3-phenyl-2-alkene. Ternary compositions outside these ranges can be employed.

The ternary composition can be applied to the desired surfaces in any suitable form, such as a solution in a mutual solvent, as an emulsion, aerosol, fog, and the like, and in any suitable manner, as by spraying, brushing, dipping, and the like. Application, according to the invention, can be effected by first applying one of the ingredients of the mixture and then applying another, and so on. For best and now preferred results, in any event, the compositions, as applied, are made up to contain a repellent adjuvant to dilute the active ingredients to an effective, but not undesirably high, concentration. Solvents, diluents, or other adjuvant carriers which are applicable include acetone, hydrocarbons such as kerosene, naphthas, and other liquid hydrocarbons. The now preferred solvent is an isoparaffinic hydrocarbon having a boiling range of approximately 260 to 800° F. Powders or dusts such as, for instance, talc are also sometimes used as the adjuvant carrier. Though not presently preferred, the repellent composition can be employed without a carrier, if desired.

When an adjuvant carrier or solvent is employed in conjunction with these ternary repellent compositions, the repellent composition will generally be in the concentration of 0.3 to 30 weight percent of the carrier material. It is now preferred that the range is from 0.5 to 15 weight percent of the carrier material.

In general, it is sufficient to deposit about 0.01 to 5 grams per square foot of surface, preferably in the range of 0.1 to 3 grams per square foot, although larger or smaller amounts can be employed.

While the ternary fly repellent composition is particularly effective as a stable fly (*Stomoxy calcitrans*) repellent, it is also effective for repelling house flies (*Musca domestica*).

Representative examples of the N-alkyl imides of bicyclo[2.2.1]-5-heptene-2,3-dicarboxylic acid include N-methyl bicyclo[2.2.1]-5-heptene-2,3-dicarboximide; N-ethyl bicyclo[2.2.1]-5-heptene-2,3-dicarboximide; N-isopropyl bicyclo[2.2.1]-5-heptene-2,3-dicarboximide; N-2-ethylhexyl bicyclo[2.2.1]-5-heptene-2,3-dicarboximide; N-t-dodecyl bicyclo[2.2.1]-5-heptene-2,3-dicarboximide; N-isoheptyl bicyclo[2.2.1]-5-heptene-2,3-dicarboximide; N-t-butyl bicyclo[2.2.1]-5-heptene-2,3-dicarboximide; N-3-propyloctyl bicyclo[2.2.1]-5-heptene-2,3-dicarboximide; N-2,3-dimethyldecyl bicyclo[2.2.1]-5-heptene-2,3-dicarboximide, and N-octyl bicyclo[2.2.1]-5-heptene-2,3-dicarboximide.

Examples of the esters of pyridine dicarboxylic acids include the di-n-propyl ester of pyridine-3,4-dicarboxylic acid, the diethyl ester of pyridine-3,5-dicarboxylic acid, the diethyl ester of pyridine-2,5-dicarboxylic acid, the di-n-propyl ester of pyridine-2,5-dicarboxylic acid, the di-n-butyl ester of pyridine-2,5-dicarboxylic acid, the diethyl ester of pyridine-2,6-dicarboxylic acid, the di-n-propyl ester of pyridine-2,6-dicarboxylic acid, the di-n-propyl ester of pyridine-2,4-dicarboxylic acid, the diethyl ester of pyridine-2,4-dicarboxylic acid, the di-n-propyl ester of pyridine-2,3-dicarboxylic acid, and the diethyl ester of pyridine-2,3-dicarboxylic acid. Of the pyridine dicarboxylic acid diesters those of pyridine-2,5-dicarboxylic acid are now preferred, especially the di-n-propyl ester of pyridine-2,5-dicarboxylic acid.

Repellency and synergism of compositions of this invention were demonstrated by the organdy bag method in the following examples:

Organdy bags having 100 square inches of area were impregnated with six to seven milliliters of acetone that contained the repellent material to be tested. As the life of a colony of stable flies is often exceeded by the repellent life of a fly-repellent composition, the impregnated bags were hung on a line and were tested after a waiting period which ranged from one to seven days. The repellents were then tested by exposing the hand to hungry stable flies through the impregnated organdy bags. The stable fly colony was not fed for several hours so that they would be hungry, and the number of flies present was kept at a high level so that at least one was attempting to bite each second. The period of effective repellency was recorded as the time from the day on which the bags were impregnated to the day on which the first bite was sustained. This recorded effective repellency period is thus one of 100 percent repellency. The results of this test are expressed below in Table I.

The 1-acetoxy-3-phenyl-2-butene used in this example was a distillation cut of boiling range 95–100° C. at 0.8 mm. Hg taken from a reaction mixture prepared in the following manner. 330 grams (10.9 moles) of paraformaldehyde, 1180 grams (10 moles) of α-methyl-styrene, 2250 milliliters of glacial acetic acid, and 3.6 milliliters of sulfuric acid (conc.) were fed to a reactor and reacted for three hours by stirring at 35° C. During this period the temperature rose to 45° C., but was lowered to 35–40° C. and kept in this range for the duration of the run. After the reaction appeared complete, the reaction mixture was poured into one liter of water and extracted with two liters of benzene. This benzene layer was then washed with one liter of water, one liter of 6 N sodium carbonate solution, and one liter of water again. Water and benzene were then distilled through a stripping assembly until the pot temperature reached 200°. Distillation cuts were then taken from the pot residue. The over-all boiling range of the reaction mixture was 85.5–114.5° C., at 0.8 mm. Hg.

*Table I*

| Compound No. | Name | | |
|---|---|---|---|
| 1 | Di-n-propyl ester of pyridine-2,5-dicarboxylic acid. | | |
| 2 | 1-acetoxy-3-phenyl-2-butene. | | |
| 3 | N-octyl bicycloheptene dicarboximide. | | |
| Run #1—Each Component Alone: | | Grams per Bag | Days Repellent |
| 1 | | 2.0 | 1 |
| 2 | | 2.0 | 4 |
| 3 | | 2.0 | 3 |
| Run #2 Binary Combinations: | | | |
| 1 and 2 | | 1.0 gram of each | 4 |
| 1 and 3 | | do | 2 |
| 2 and 3 | | do | 7 |
| Run #3 Ternary Combination: | | | |
| 1, 2, and 3 | | 0.5 of compound 1<br>0.5 of compound 2<br>1.0 of compound 3 | 13 |

These data show clearly the synergism exhibited by the ternary composition. It is seen that the ternary composition has a longer effective repellent life than any combination of two of the three materials, or than any one of the three materials alone.

As will be evident to those skilled in the art, various modifications of this invention can be made or followed in the light of the foregoing disclosure and discussion without departing from the spirit or scope of the disclosure or from the scope of the claims.

We claim:

1. A ternary synergistic repellent composition comprising the following three components as the essential active repellent composition: (a) at least one di-n-alkyl ester of a dicarboxylic acid of pyridine wherein the alkyl groups contain from 2 to 4 carbon atoms, (b) at least one 1-acetoxy-3-phenyl-2-alkene wherein the alkene is an alkene having from three to four carbon atoms, and (c) at least one N-alkyl imide of bicyclo[2.2.1]-5-heptene-2,3-dicarboxylic acid wherein the alkyl radical contains not more than 12 carbon atoms, wherein said alkyl imide is present in the ternary composition in an amount in the range from 25 to 75 percent, on an undiluted basis of said ternary composition and the ratio of said ester of said pyridine carboxylic acid to said 1-acetoxy-3-phenyl-2-alkene is in the range from 4:1 to 1:4.

2. The composition of claim 1 wherein the said ester is an ester of pyridine-2,5-dicarboxylic acid.

3. The composition of claim 1 wherein the said 1-acetoxy-3-phenyl-2-alkene is 1-acetoxy-3-phenyl-2-butene.

4. The composition of claim 1 wherein the said 1-acetoxy-3-phenyl-2-alkene is 1-acetoxy-3-phenyl-2-propene.

5. The composition of claim 2 wherein the said 1-acetoxy-3-phenyl-2-alkene is 1-acetoxy-3-phenyl-2-butene.

6. The composition of claim 2 wherein the said 1-acetoxy-3-phenyl-2-alkene is 1-acetoxy-3-phenyl-2-propene.

7. The composition of claim 5 wherein the said ester is the di-n-propyl ester of pyridine-2,5-dicarboxylic acid and said alkyl imide is N-octyl bicyclo[2.2.1]-5-heptene-2,3-dicarboximide.

8. The composition of claim 5 wherein the said ester is the diethyl ester of pyridine-2,5-dicarboxylic acid.

9. The composition of claim 5 wherein the said ester is the di-n-butyl ester of pyridine-2,5-dicarboxylic acid.

10. The composition of claim 1 wherein the said N-alkyl imide is selected from the group consisting of N-methyl bicyclo[2.2.1]-5-heptene-2,3-dicarboximide; N-ethyl bicyclo[2.2.1]-5-heptene-2,3-dicarboximide; N-isopropyl bicyclo[2.2.1]-5-heptene-2,3-dicarboximide; N-2-ethylhexyl bicyclo[2.2.1]-5-heptene-2,3-dicarboximide; N-t-dodecyl bicyclo[2.2.1]-5-heptene-2,3-dicarboximide; N-isoheptyl bicyclo[2.2.1]-5-heptene-2,3-dicarboximide; N-t-butyl bicyclo[2.2.1]-5-heptene-2,3-dicarboximide; N-3-propyloctyl bicyclo[2.2.1]-5-heptene-2,3-dicarboximide; N-2,3-dimethyldecyl bicyclo[2.2.1]-5-heptene-2,3-dicarboximide, and N-octyl bicyclo[2.2.1]-5-heptene-2,3-dicarboximide.

11. The composition of claim 1 in a suitable solvent for said repellent.

12. A method of rendering a surface repellent to flies which comprises applying to said surface a composition of claim 1.

13. The composition of claim 1 wherein the said N-alkyl imide is N-octyl bicyclo[2.2.1]-5-heptene-2,3-dicarboximide.

14. The composition of claim 1 wherein the said N-alkyl imide is N-2-ethylhexyl bicyclo[2.2.1]-5-heptene-2,3-dicarboximide.

15. The composition of claim 1 wherein the said N-alkyl imide is N-t-butyl bicyclo[2.2.1]-5-heptene-2,3-dicarboximide.

16. The composition of claim 1 wherein the said N-alkyl imide is N-isoheptyl bicyclo[2.2.1]-5-heptene-2,3-dicarboximide.

17. The composition of claim 1 wherein the said N-alkyl imide is N-t-dodecyl bicyclo[2.2.1]-5-heptene-2,3-dicarboximide.

18. A ternary synergistic repellent composition comprising the following three components as the essential active repellent composition: (a) the di-n-propyl ester of pyridine-2,5-dicarboxylic acid, (b) 1-acetoxy-3-phenyl-2-butene, and (c) at least one N-alkyl imide of bicyclo-[2.2.1]-5-heptene-2,3-dicarboxylic acid wherein the alkyl radical contains not more than 12 carbon atoms, wherein said alkyl imide is present in the ternary composition in an amount in the range from 25 to 75 percent, on an undiluted basis of said ternary composition and the ratio of said ester of said pyridine carboxylic acid to said 1-acetoxy-3-phenyl-2-butene is in the range from 4:1 to 1:4.

19. A method of repelling flies which comprises subjecting the locus from which the insect is to be repelled to the action of a composition of claim 18.

20. The composition of claim 18 wherein the said N-alkyl imide is N-2-ethylhexyl bicyclo[2.2.1]-5-heptene-2,3-dicarboximide.

References Cited in the file of this patent

UNITED STATES PATENTS

| | | |
|---|---|---|
| 2,043,941 | Williams | June 9, 1936 |
| 2,424,220 | Bousquet | July 22, 1947 |
| 2,757,120 | Leonard | July 31, 1956 |

OTHER REFERENCES

Drake et al.: Abstr. of Ser. No. 70,392, pub. January 9, 1951.

Prostenik et al.: Archiv. Kemi, vol. 18, pp. 3–9, 1946 (Chem. Abstr., vol. 42, 3398 C., 1948).

OSRD Insect Control Comm. Rpt. No. 28, Interim Rpt. No. 0–94, May 18, 1945. Pub. August 1, 1947, 50 pp. plus 1 p. of index, part. p. 27, Orlando No. 0–2333, Pyridine-2,3-dicarboxylic acid, dimethyl ester, and pp. 1–4, 9, 16 and 21 for methods of using the repellents.